United States Patent
Schacht et al.

(10) Patent No.: US 8,979,442 B2
(45) Date of Patent: Mar. 17, 2015

(54) SYSTEM AND METHOD FOR MODIFYING A GAS TURBINE ENGINE IN THE FIELD

(75) Inventors: Thomas C. Schacht, San Diego, CA (US); David Rodriguez, Torrance, CA (US)

(73) Assignee: Solar Turbines Incorporated, San Diego, CA (US)

( * ) Notice: Subject to any disclaimer, the term of this patent is extended or adjusted under 35 U.S.C. 154(b) by 171 days.

(21) Appl. No.: 13/472,921

(22) Filed: May 16, 2012

(65) Prior Publication Data

US 2013/0305508 A1 Nov. 21, 2013

(51) Int. Cl.
| | | |
|---|---|---|
| B23B 39/00 | (2006.01) | |
| B23P 6/00 | (2006.01) | |
| F01D 5/00 | (2006.01) | |
| F01D 25/28 | (2006.01) | |
| F01D 5/18 | (2006.01) | |

(52) U.S. Cl.
CPC ............ *B23P 6/002* (2013.01); *B23P 2700/06* (2013.01); *F01D 5/005* (2013.01); *F01D 5/186* (2013.01); *F01D 25/285* (2013.01); *Y10T 29/49746* (2013.01)
USPC .................... 408/115 R; 29/26 R; 29/402.01; 29/559; 29/889.1; 409/110; 409/93; 408/97

(58) Field of Classification Search
CPC ... F01D 5/005; F01D 25/285; F05B 2230/80; B23P 6/002; B23P 13/00; B23P 15/006; B23B 47/28; B23B 2247/12; B23B 2215/76; B23B 41/00
USPC ............ 29/889.1, 889.2, 402.01, 559, 281.4, 29/281.6; 409/110, 93, 85, 79; 408/115 R, 408/97
See application file for complete search history.

(56) References Cited

U.S. PATENT DOCUMENTS

| | | | | |
|---|---|---|---|---|
| 2,422,994 A | * | 6/1947 | Taylor | 408/59 |
| 2,603,986 A | * | 7/1952 | Cupler | 408/38 |
| 2,877,670 A | * | 3/1959 | Allen | 408/4 |
| 4,096,615 A | * | 6/1978 | Cross | 29/889.21 |
| 5,893,690 A | * | 4/1999 | Haninger | 409/134 |
| 2009/0165275 A1 | | 7/2009 | Cole et al. | |
| 2010/0193054 A1 | * | 8/2010 | Hernandez et al. | 137/565.18 |

FOREIGN PATENT DOCUMENTS

| | | |
|---|---|---|
| EP | 1 101 563 A2 | 5/2001 |
| EP | 2 359 972 A2 | 8/2011 |

* cited by examiner

*Primary Examiner* — David Bryant
*Assistant Examiner* — Jun Yoo
(74) *Attorney, Agent, or Firm* — Procopio, Cory, Hargreaves & Savitch LLP (57) ABSTRACT

A system and method for modifying a gas turbine engine in the field to drill a series of cooling holes in a turbine rotor disk made of a superalloy. A portable field repair system includes a stand configured to receive, support, and position a turbine rotor disk, a drill having a self-feeding spindle and configured to automatically drill a predetermined depth through a superalloy and to automatically stop upon completion, a drill guide configured to coordinate the drill with a plurality of radial axes associated with a precise hole pattern to be cut and a drill mount configured to mechanically couple the drill to the drill guide and to position the drill during the modification of the gas turbine engine turbine rotor disk.

18 Claims, 6 Drawing Sheets

SYSTEM AND METHOD FOR MODIFYING A GAS TURBINE ENGINE IN THE FIELD

TECHNICAL FIELD

The present disclosure generally pertains to a gas turbine engine, and is more particularly directed toward a system and method for the modification and retrofitting of a turbine rotor disk.

BACKGROUND

Modern turbine rotor disks are made from durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as Hastelloy, Inconel, Waspaloy, Rene alloys, Haynes alloys, Incoloy, MP98T, TMS alloys, and CMSX single crystal alloys. While superalloys are high performing, they are also extremely expensive, and difficult to machine.

U.S. Pat. App. Pub. No. 2009/0165275 to Cole et al. describes a method for repairing a turbine nozzle segment having a band and a plurality of airfoils, where the band has a flange. The method includes the steps of repairing a damaged area on the turbine nozzle segment and drilling a plurality of cooling holes in the flange.

The present disclosure is directed toward overcoming one or more of the problems associated with the systems discussed above as well as additional problems discovered by the inventor.

SUMMARY OF THE DISCLOSURE

A system for modifying a gas turbine engine in the field includes a stand configured to receive, support, and position a turbine rotor disk removed from the gas turbine engine, the turbine rotor disk made from a superalloy. The system further includes a drill having a self-feeding spindle and a nose piece alignment bushing. The drill is configured to automatically drill a predetermined depth through the superalloy along a single drill axis upon initiation, and to automatically stop upon completion. The system also includes a drill guide configured to coordinate the single drill axis with a plurality of radial axes associated with the turbine rotor disk such that the single drill axis is prevented from departing one of the plurality of radial axes beyond design tolerances associated with a modification to be performed when drilling has been initiated. Also included is a drill mount configured to mechanically couple the drill to the drill guide and to position the drill during drilling operations.

DETAILED DESCRIPTION

Figure 1:
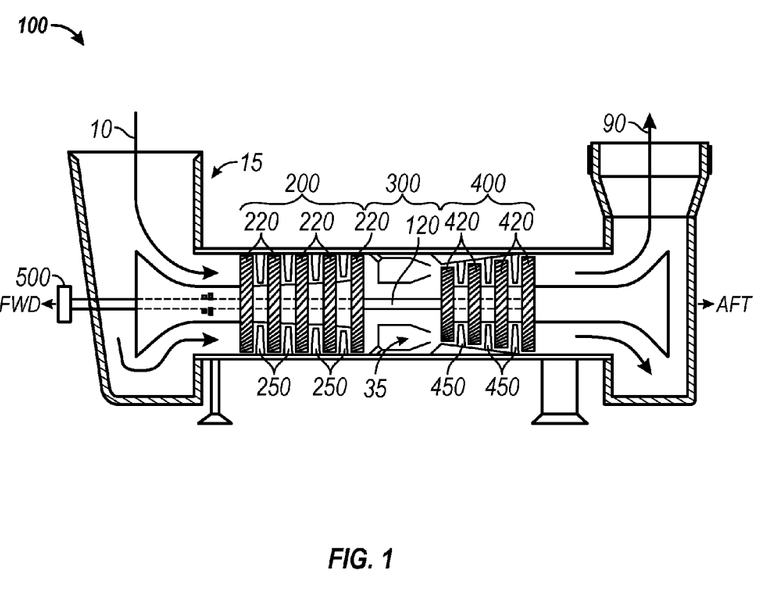
FIG. 1 is a schematic illustration of an exemplary gas turbine engine.

FIG. 1 is a schematic illustration of an exemplary gas turbine engine. A gas turbine engine 100 typically includes a compressor 200, a combustor 300, and a turbine 400. Air 10 enters an inlet 15 as a "working fluid", and is compressed by the compressor 200. Fuel 35 is added to the compressed air in the combustor 300 and then ignited. Energy is extracted from the combusted fuel/air mixture via the turbine 400, and is typically made usable via a power output coupling 500. Power output coupling 500 is shown as being on the forward side of the gas turbine engine 100, but in other configurations it may be provided at the aft end of gas turbine engine 100. Exhaust 90 may exit the system or be further processed (e.g., to reduce harmful emissions, and/or to recover heat from the exhaust gas and add it to the compressor outlet air before the air enters the combustion chamber).

The compressor 200 and turbine 400 respectively include one or more rotor assemblies 220, 420 mechanically coupled to a shaft 120 or drum (not shown). As illustrated, rotor assemblies 220, 420, are axial flow rotor assemblies, where each rotor assembly includes a rotor disk that is circumferentially populated with a plurality of airfoils ("rotor blades"). When installed, the rotor blades associated with one rotor disk are axially separated from the rotor blades associated with an adjacent disk by stationary vanes ("stator vanes" or "stators") 250, 450 circumferentially distributed in an annular casing. Together the compressor rotor assembly(ies) 220, the turbine rotor assembly(ies) 420, and the shaft 120 (or drum) that connects the two is generally referred to as a "spool".

In the compressor 200, the working fluid is compressed in an annular flow path by the compressor rotors, which are driven by the turbine spool. The air is compressed in numbered "stages", which are associated with each compressor rotor assembly 220. The pressure at an earlier stage in the flow path is lower than at a subsequent stage. Depending on the required final compression ratio (e.g., 10:1, 20:1, etc.), a compressor 200 may have many compression stages. In addition, a compressor may include both a low pressure compressor and a high pressure compressor, which may spin at different speeds using different spools.

In the turbine 400, the energized working fluid travels in an annular flow path and "drives" the turbine rotor assemblies 420, which "drive" the turbine spool. Like the compressor 200, turbine 400 may have numbered "stages" that are associated with each turbine rotor assembly 420. Here, however, the pressure at an earlier stage in the flow path is higher than at a subsequent stage. Depending on performance parameters, a turbine 400 may have many stages. In addition, a turbine 400 may include both a high pressure turbine and a low pressure turbine, which may spin at different speeds via different spools.

Figure 2:
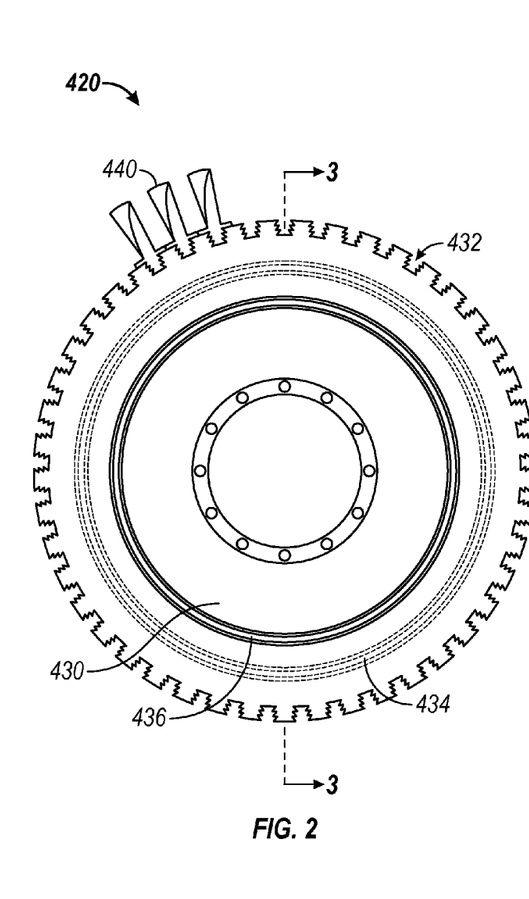
FIG. 2 is a plan view of an exemplary turbine rotor assembly including a rotor disk (top view).
Figure 3:
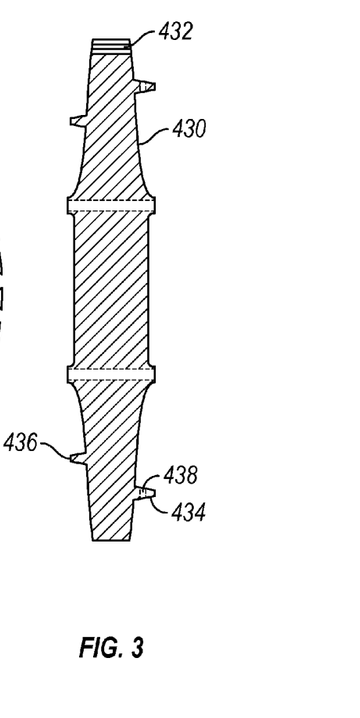
FIG. 3 is a sectional view of the exemplary turbine rotor disk of FIG. 2 taken along plane 3-3.

FIG. 2 is a top, plan view of an exemplary turbine rotor. FIG. 3 is a sectional view of the exemplary turbine rotor of FIG. 2 taken along plane 3-3. Referring now to those two figures, as discussed above, each turbine rotor assembly 420 includes a turbine rotor disk 430. The turbine rotor disk may be made of a suitable durable, high temperature material selected from the group known as "superalloys". A superalloy, or high-performance alloy, is an alloy that exhibits excellent mechanical strength and creep resistance at high temperatures, good surface stability, and corrosion and oxidation resistance. Superalloys materials such as Hastelloy, Inconel, Waspaloy, Rene alloys, Haynes alloys, Incoloy, MP98T, TMS alloys, and CMSX single crystal alloys.

The turbine rotor disk 430 is circumferentially populated with a plurality of turbine rotor blades 440. Here, for illustration purposes, turbine rotor disk 430 is shown depopulated of all but three turbine rotor blades 440. Turbine rotor disk 430 includes circumferentially distributed slots which are referred to as "blade attachment roots" 432 (e.g., "fir tree" or "bulb" roots) to receive each turbine blade 440. As illustrated, turbine rotor disk 430 includes cooling arms 434, 436, which form a circumferential lip on each side of turbine rotor disk 430. In some installations, cooling arms 434, 436 bridge a gap with an adjacent turbine rotor disk or other surface, which may create a sealed or semi-sealed area for cooling air to be used and distributed. Responsive to the high temperatures in the turbine, a series of radially extending cooling holes 438 may also be drilled in one or both cooling arms 434, 436, such that cooling air may impinge upon or otherwise migrate toward the attachment root interface between the turbine rotor disk 430 and the turbine rotor blade 440, as well as the rest of the turbine rotor disk's 430 perimeter region and the base of the turbine blades 440.

Figure 4:
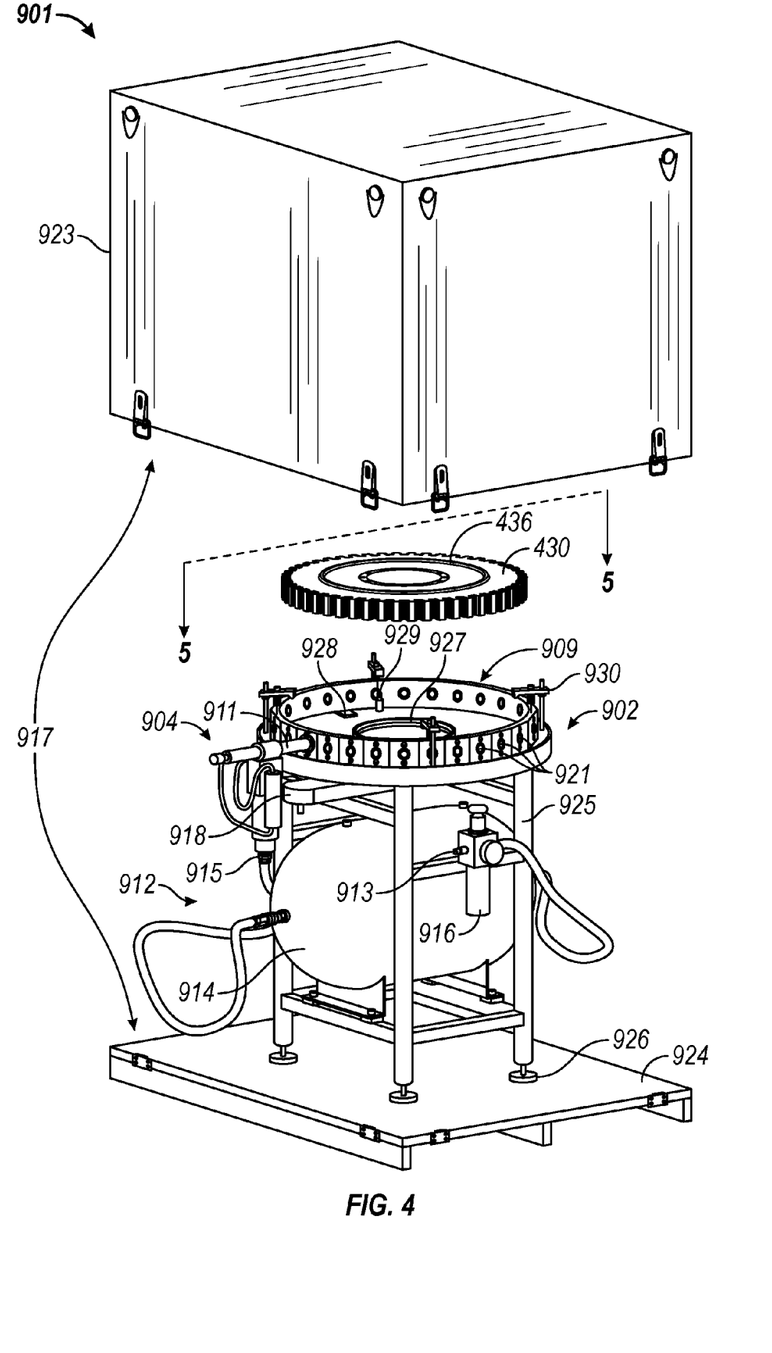
FIG. 4 is a partially exploded view of an exemplary system for modifying a gas turbine engine in the field and a turbine rotor disk.

FIG. 4 is a partially exploded view of an exemplary system for modifying a gas turbine engine in the field and a turbine rotor. In particular, system 901 is a portable field repair kit configured to drill a series of cooling holes through a superalloy. The system may be configured to only use standard shop air as a power source and minimal technical support. The system 901 may include components such as a stand 902, a drill 904, a drill guide 909, and a drill mount 911.

System 901 may be configured as a portable kit. The system 901 may include an enclosure 917 configured to enclose the system during transport and to permit operational access to the system upon deployment. As illustrated, enclosure 917 may include a cover 923 and a palletized floor 924, such that system 901 may be transported with a forklift or even a pallet jack. Stand 902 may be temporarily secured to the palletized floor 924 of enclosure 917 though various known methods (e.g., straps, clamps, bolts, etc.), wherein the stand 902 may be removed from the palletized floor 924 once deployed. In the alternate, stand 902 may be integrated into the enclosure 917 (e.g., bolted to palletized floor 924), or otherwise configured to remain fixed to one or more sections of enclosure 917 upon deployment and during drilling operations. Enclosure 917 may include subcompartments or internal tool cases that carry additional tools, consumable supplies, and spare parts, which may be needed in making the modification to the gas turbine engine 100.

As illustrated, stand 902 may include a frame 925 configured to receive, support, and position a turbine rotor disk 430 removed from the gas turbine engine 100. Frame 925 may include features to mitigate instability such as adjustable foot pads 926 so as to provide a more stable platform for drilling operations. Stand 902 may also include integrated features such as an alignment ring 927 configured to center the turbine rotor disk 430, one or more index keys 928 configured to horizontally position and orient the turbine rotor disk 430 as required, a plurality of posts 929 configured to vertically position the turbine rotor disk 430 as required, and one or more clamps 930 configured to secure turbine rotor disk 430 to the stand 902 during machining operations.

Stand 902 may be further configured to position turbine rotor disk 430 such that the cooling arm 434, 436 to be drilled is below the balance of the turbine rotor disk 430 (i.e., "cooling arm facing down") when drilling is being performed. While it is counterintuitive to orient the turbine rotor disk such that the cut is blocked from view, by securing the turbine rotor disk 430 to the stand 902 in this way, used coolant/lubricant may be contained locally between the turbine rotor disk 430 and the stand 902. Moreover, since the cuts are made by the system 901 rather than the technician, there is less need for viewing the cut.

The stand 902 may also support and position one or more other components of the system 901, or they may be integrated directly into the stand 902. For example, stand 902 may further include an alignment ring/groove (not shown), one or more index keys (not shown), and one or more fasteners (not shown) for the drill guide 909 to align and attach to the stand 902 (not to be confused with the similar features for the turbine rotor disk 430). In this way, a field technician may merely mate an index of the drill guide 909 with an index key and ensure that the drill guide 909 is fully seated in its alignment groove and secure it with one or more fasteners underneath. In addition, as a detachable unit, drill guide 909 may be stored separately in a protective case providing for more compact storage within enclosure 917, additional protection against misalignment damage during transport, and versatility of operations when drill guide 909 is not installed and not in use. Alternately, drill guide 909 may be integrated into, and form a permanent part of the stand 902. In similar manner, other elements of system 901 may be aligned and attached, or alternately integrated directly into stand 902.

As illustrated, rather than applying shop air directly to the drill 904, system 901 may include a compressed air subsystem 912. Compressed air subsystem 912 may include a compressed air receptacle 913 coupled to an air tank 914 which is then coupled to a drill interface 915. As such, the compressed air subsystem 912 still couples a shop air supply with the drill 904, but also includes storage capacity. As shown in this embodiment, compressed air subsystem 912 may be coupled to stand 902. In operation, once system 901 is deployed, local shop air may be coupled to compressed air receptacle 913, providing a more stable source of pneumatic power to system 901. In alternate embodiments, where drill is electrically or mechanically powered, system 901 may include a corresponding energy storage system (analogous to compressed air subsystem 912) providing a more stable source of power to the drill 904.

According to one embodiment the air supply subsystem meters or regulates compressed air to the drill from both the compressed air receptacle and the air tank. In this way, any spikes in the shop air supply may be taken up in the air tank 914, and any lulls in the shop air supply may be compensated for by compressed air previously stored in the air tank 914. Air tank 914 may be of sufficient capacity to supply enough air to drill one hole from start to finish without external air being supplied. In this way, a technician may still complete a cut in the event of loss shop air. According to one embodiment the compressed air subsystem 912 may also include an air lubricator 916. Air lubricator 916 may be interspersed anywhere between the compressed air receptacle 913 and the drill interface 915. Air lubricator 916 meters air lubricant into the air flow, lubricating moving pneumatic components as well as resisting corrosion.

Stand 902 may include a lubricant drip receptacle 918 configured collect used lubricant of the system 901 (e.g., air lubricant, cutter lubricant, etc.). Lubricant drip receptacle 918 may be made removable, for example with a quick release detent pin. In this way, a technician may easily transport waste lubricant to a designated oil collection location.

Figure 5:
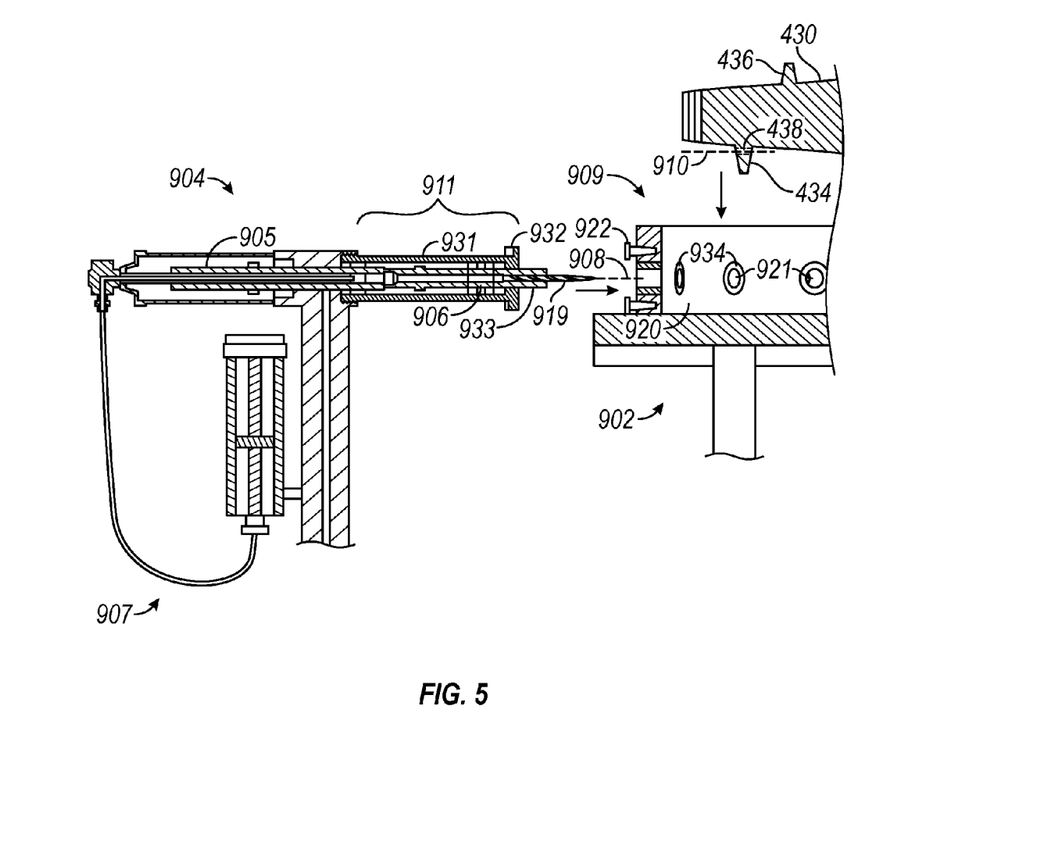
FIG. 5 is a sectional view of a portion of the system and turbine rotor disk of FIG. 4 prior to the drill interfacing with a drill guide.

FIG. 5 is a sectional view of a portion of the system and turbine rotor of FIG. 4 prior to the drill interfacing with a drill guide. In general, turbine rotor disk 430 mounts on to stand 902 and drill 904 interfaces with drill guide 909 via drill mount 911. When assembled, drill guide 909 aligns the cutting bit or "cutter" 919 of the drill 904 with turbine rotor disk 430, and drill mount 911 supports drill 904.

As illustrated, drill 904 may include a self-feeding spindle 905, a nose piece alignment bushing 906, and an integrated cutter lubricant subsystem generally identified as 907. Drill 904 has a single drill axis 908 in which, upon initiation of the drill 904, the self-feeding spindle 905 may automatically drill to a predetermined depth through the superalloy material, along single drill axis 908, and may automatically stop upon completion. The drill 904 may be preset in advance in one or more of: drill speed, spindle feed speed, lubricant flow rate, and cut depth. In this way, a technician in the field need only engage the drill 904 with drill guide 909 and initiate a drill trigger to make a single cut. In other embodiments the system 901 might not be automatic or automatic to the degree described. Manual control may be required, for example, where drill power is insufficient to operate both drilling operations and spindle feed or where the technician need to compensate for an unanticipated condition on the work site.

Referring to drill 904, nose piece alignment bushing 906 attaches to the drill mount 911 which is attached to the drill 904. This assembly coordinates the single drill axis 908 with the desired cut axis when inserted into a corresponding bushing 934 of drill guide 909. Nose piece alignment bushing 906 may perform additional functions, such as discussed below.

Still referring to drill 904, integrated cutter lubricant subsystem 907 provides lubricant/coolant to the cutter. In order to cut superalloys, the cutter 919 may be a hardened cutter, wherein the integrated cutter lubricant subsystem 907 may dispense lubricant/coolant to the cutter 919. Integrated cutter lubricant subsystem 907 may be operated using pneumatic power, which is also used to power the motor and the self feeding spindle 905 of drill 904. According to one embodiment, an internally cooled carbide drill bit may be employed as the cutter 919. A lubricant coolant such as Boelube 70104 (manufactured by the Boeing company) or the like may then be pressure fed through the hollow passages of the internally cooled carbide drill bit (cutter 919), providing both lubrication and cooling during the drilling process. According to one embodiment, stand 902 may be configured to direct any used drill lubricant/coolant toward the lubricant drip receptacle 918, for example, via any combination of splash baffles, drainage pathways, and drain holes.

As illustrated, drill guide 909 is configured to coordinate the single drill axis with a plurality of radial axes 910 associated with the modification to the turbine rotor disk 430. In this way, the single drill axis 908 is prevented from departing one of the plurality of radial axes, beyond design tolerances associated with the modification to be performed, once drilling has been initiated. For example, once nose piece alignment bushing 906 of drill 904 is installed in drill guide 909, cooling hole or opening 438 may be held to a 0.020" centerline tolerance. According to one embodiment, the drill guide 909 may be constructed in the shape of a ring 920 that encircles the turbine rotor disk 430 and is positively keyed to the turbine rotor disk 430 so as to properly align itself Drill guide 909 may include a series of radial access holes 921 (which may incorporate bushings 934) configured to interface with the nose piece alignment bushing 906, and align with its respective radial axis 910 of the turbine rotor disk 430. Drill guide 909 may also include retention or locking features to secure the drill mount 911 such as discussed below.

As discussed above, drill mount 911 mechanically couples the drill 904 to the drill guide 909 via one of the radial access holes 921, and positions the drill 904 during drilling operations. Drill mount 911 may take any convenient form or configuration, and may couple with or otherwise be integrated into at least one of: the stand, 902 (e.g., as a support arm attached to frame 925), the drill guide 909 (e.g., as a drill receiver/support), the drill 904 (as illustrated), or a combination thereof. As illustrated, drill mount 911 may include a nose piece extension 931 that threads into the face of drill 904, and includes a locking collar 932. It should be noted that the locking collar 932 may take any number of forms and is illustrated here as a camloc-type coupling as one possible fastening mechanism. In this embodiment, drill mount 911 is integrated into drill 904, and can be individually engaged in each radial access hole 921 of drill guide 909 while drill guide 909 and turbine rotor disk 430 remain stationary relative to stand 902.

Moreover, in some embodiments, one or more features of different elements of the system 901 may be incorporated in a single part without departing from the disclosure. For example, a single air feed drill bushing (not shown) may be used, which would include both the locking collar 932 and its own bushing interface 933. The single air feed drill bushing would then screw into nose piece extension 931, forming drill mount 911. In this embodiment, drill mount 911 incorporates the functionality of nose piece alignment bushing 906. Furthermore, drill mount 911 may then couple with (i.e., screw into) the nose piece alignment bushing 906, and thus also be viewed as being integrated into drill 904.

In both exemplary configurations described above, upon installation of drill mount 911 into the body of drill 904, a technician may insert the bushing interface 933 portion of nose piece alignment bushing 906 into the drill guide 909 and apply a 30 degree turn to lock or fully engage the drill 904 into position. Also, in these types of configurations drill guide 909 may include locking fasteners 922 (e.g., locking screws) that are used in conjunction with drill mount 911 (e.g., via locking collar 932) to provide a positive lock.

It is understood that the preceding examples of engaging the drill 904 with the drill mount 911 and the drill guide 909 are exemplary in nature and not limiting. In addition, it is recognized that the system 901 disclosed may be constructed in a form factor that could readily be transported (e.g., in the back of a pickup truck) and could realistically be deployed to remote locations having minimal resources (e.g., air compressor and forklift only), and could be deployed, assembled, and operated by a technician in the field.

Figure 6:
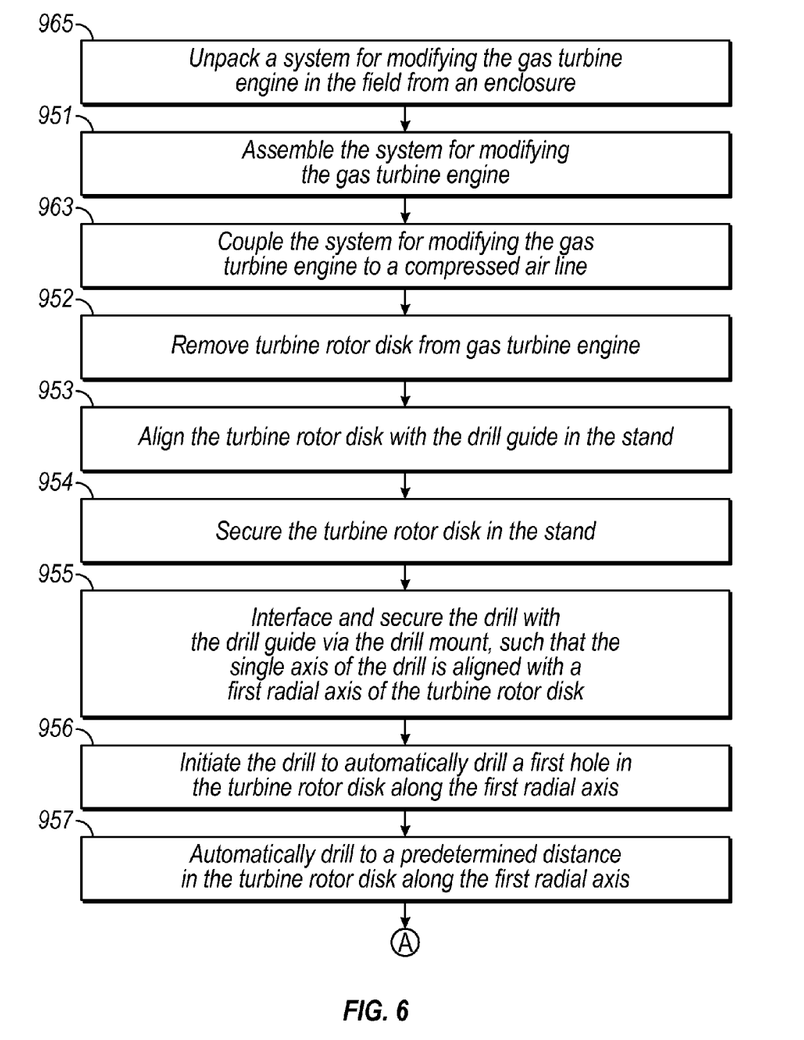
FIG. 6 is a flow chart of the first portion of an exemplary method for modifying a gas turbine engine in the field.

FIG. 6 is a flow chart of an exemplary embodiment of a method for modifying a gas turbine engine in the field. The method may be performed with the aid of the system for modifying a gas turbine engine in the field described above.

The method begins with unpacking 965 the previously described system for modifying the gas turbine engine from a shipping enclosure, assembling 951 the system, and coupling 963 the system to a power source, such as a compressed gas line (e.g., shop air hose). As described above, assembling the system may include configuring the stand, the drill mount, the drill, and the drill guide for the modification operations. System components, such as the drill guide, may be secured to the stand with hand screws or other conventional fastening mechanisms.

In addition, a turbine rotor disk is removed from the gas turbine engine in a step 952. In step 953, the turbine rotor disk is aligned with the drill guide such that each single drill axis will be coordinated with one of a plurality of radial axes associated with cooling holes to be made in the turbine rotor disk. This alignment may be accomplished using one or more of index keys, vertical alignment posts, and an alignment ring, provided with the stand. Once the turbine rotor disk has been positioned and aligned, the method may include securing 954 the turbine rotor disk in the stand, which may be accomplished using clamps provided with the stand or the drill guide.

It is understood that the steps disclosed herein (or parts thereof) may be performed in the order presented or out of the order presented, unless specified otherwise. For example, portions of assembling 951 the system (e.g., configuring and securing the drill guide to the stand) may be performed after the step of securing 954 the turbine rotor disk in the stand. Likewise, it is understood that multiple steps may be combined. For example, continuing with the above example, aligning 953 the turbine rotor disk with the drill guide may be combined with the configuring and securing the drill guide to the stand portions of assembling 951 the system.

Figure 7:
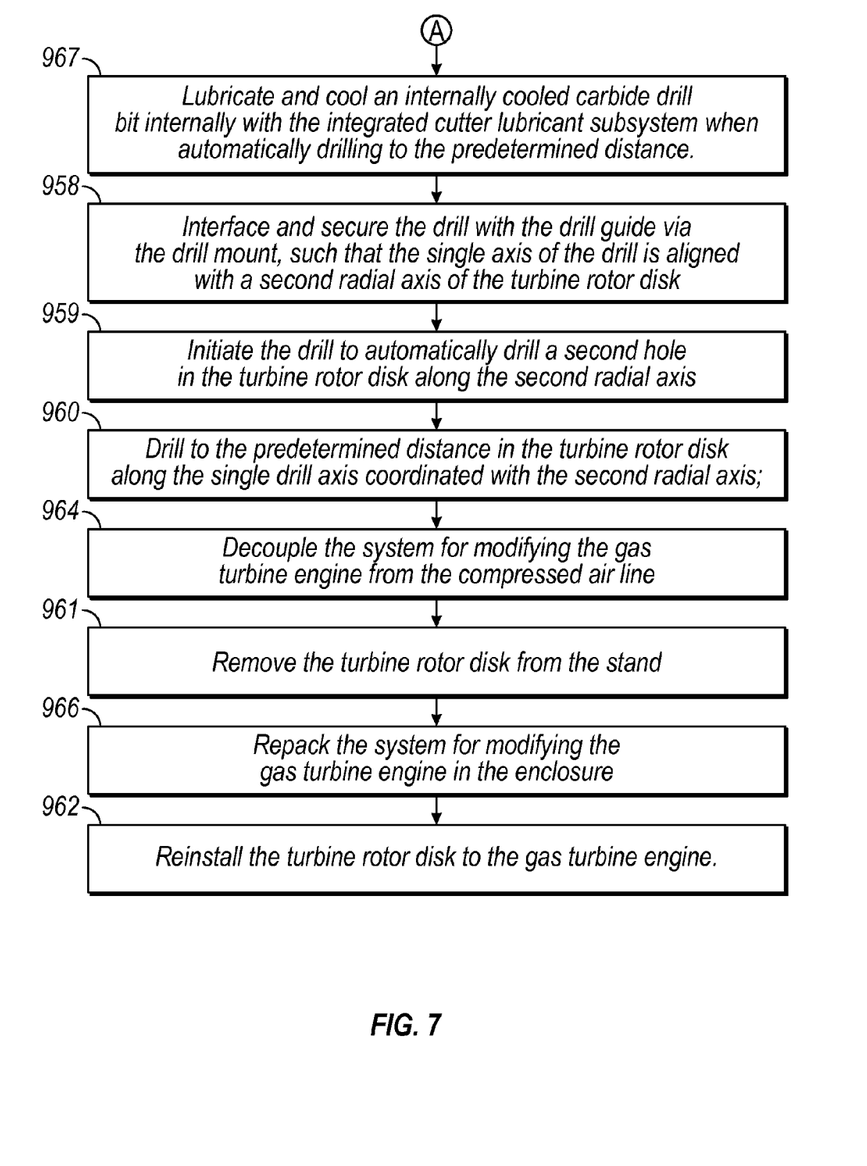
FIG. 7 is a flow chart of the second portion of an exemplary method for modifying a gas turbine engine in the field.

Once the system is sufficiently assembled and the turbine rotor disk is secured in place, the method may further include the steps of interfacing and securing 955 the drill with the drill guide via the drill mount, such that the single drill axis is aligned with a first radial axis of the turbine rotor disk, initiating 956 the drill to automatically drill a first hole in the turbine rotor disk, and automatically drilling 957 to a predetermined distance in the turbine rotor disk along the single drill axis coordinated with the first radial axis. Where the drill includes an integrated cutter lubricant subsystem, the method may further include the step of lubricating and cooling 967 an internally cooled carbide drill bit internally with the integrated cutter lubricant subsystem when drilling to the predetermined distance.

Once the first cooling hole is cut into the turbine rotor disk cooling arm, the process may repeat. Accordingly, the method may further include the steps of interfacing and securing 958 the drill with the drill guide via the drill mount, such that the single drill axis is aligned with a second radial axis of the turbine rotor disk, initiating 959 the drill to automatically drill a second hole in the turbine rotor disk, and automatically drilling 960 to the predetermined distance in the turbine rotor disk along the single drill axis coordinated with the second radial axis. These steps may repeat as needed to complete the modification. It is understood that, depending on the number of cooling holes to be cut, the drill may need to be periodically resupplied. For example, coolant/lubricant may need to be replenished over time, and the carbide drill bit may be replaced every five or so holes.

Once all cooling holes have be cut, the method may further include decoupling 964 the system from shop air hose, removing 961 the turbine rotor disk from the stand, and repacking 966 the system in the enclosure, for example for subsequent shipment/return. After the modification is performed, the method may include reinstalling 962 the turbine rotor disk in the gas turbine engine.

Industrial Applicability

The disclosed system and method system for modifying a gas turbine engine in the field is applicable to the use, operation, maintenance, repair, and improvement of gas turbine engines. The gas turbine engine embodiments described herein may be suited for any number of industrial applications, such as, but not limited to, various aspects of the oil and natural gas industry (including transmission, gathering, storage, withdrawal, and lifting of oil and natural gas), power generation industry, aerospace and transportation industry, to name a few examples.

Furthermore, there are numerous gas turbine engine configurations and types that are applicable here. For example, additional compressors and turbines could be added with intercoolers connecting between the compressors, reheat combustion chambers could be added between the turbines, and multiple compressor and turbine stages could be present. In addition, the gas turbine engine may operate on one or more different fuels.

Because turbine rotor disks are made from "superalloys", they may be expensive and difficult to machine. Typically, machining of turbine rotors is done in assembly plants using highly specialized, heavy, expensive and powerful computer numerical control (CNC) machines such as a horizontal CNC mill (e.g., 4-axis Niigata HN8DC-weighing over 40,000 lbs). Even with such heavy equipment, a specially trained machinist, and a controlled, factory environment, superalloys such as Waspaloy are still very difficult to cut, and quickly wear out milling cutters in the process.

Sometimes it is determined that additional cooling holes are required in turbine rotor disks already in the field. Such post production machining of rotor disks is typically performed by returning the rotor disks to the assembly plant. However, that can cause long shut downs of the turbine or require the use of very expensive replacement parts.

The embodiment of system 901 is able to machine the additional cooling holes in a superalloy with only a fraction of the machinery normally required as described above. In contrast to those machines, system 901 may weigh less than 700 lbs, and thus be portable in a practical sense. Moreover, having only one axis of automated operation, precision machining may be performed by a field technician. In particular, once deployed, system 901 may merely require the initiation of a single trigger, followed by a manual resetting of the drill 904.

Systems and methods described herein provide for field technician to manually position the drill 904 and insert the nose piece alignment bushing 906 into a first radial access hole 921, lock the drill 904 into place, pull the drill trigger, and wait until a "click" sound indicates the self-feeding spindle 905 has extended its preset distance. Lubricant/coolant may automatically be fed into the drill bit (cutter 919) onto the cutting surface, and collected in the lubricant drip receptacle 918. At this point the technician can unlock the drill 904, remove the drill 904, clean off any debris, and inspect the precision cut cooling hole 438. As described above, it is understood there may be conditions where the technician manually performs one or more operations that might otherwise be automated.

The drill 904, drill guide 909, and drill mount 911 of embodiments described herein are coordinated such that a field technician may precisely drill a series of cooling holes in a turbine rotor disk made of a superalloy without the aid of computer numerical control (CNC) machines or other heavy factory equipment.

In order to improve efficiency, decrease maintenance, and lower costs, embodiments of the presently disclosed system and method system for modifying a gas turbine engine in the field may be performed at any stage of the turbine rotor disk's life, from first manufacture and prototyping to end of life. For example, the disclosed system and method system for modifying a gas turbine engine in the field may be part of a retrofit of preexisting gas turbine engine, where one or more turbine rotor disks are repaired, reworked, or otherwise modified. In addition, the system and method may be used in response to an event, as a preventative measure, or as an enhancement to an existing gas turbine engine.

The preceding detailed description is merely exemplary in nature and is not intended to limit the invention or the application and uses of the invention. The described embodiments are not limited to use in conjunction with a particular type of gas turbine engine. Hence, although the present embodiments are, for convenience of explanation, depicted and described as being implemented in a single spool gas turbine engine, it will be appreciated that it can be implemented in various other types of turbines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A system for modifying a gas turbine engine in the field, the system comprising:
   a stand configured to receive, support, and position a turbine rotor disk removed from the gas turbine engine, the turbine rotor disk made from a superalloy;
   a drill having a single drill axis;
   a drill guide including a plurality of radial access holes;
   a drill mount configured to mechanically couple the drill to the drill guide and to position the drill during drilling operations, the drill mount including
      a nose piece extension extending from the drill, the nose piece extension including a first end threaded into a face of the drill and a second end distal to the first end, and
      a locking collar proximal the second end; and
   a nose piece alignment bushing attached to the drill mount, the nose piece alignment bushing including a bushing interface that interfaces with the plurality of radial access holes to coordinate the single drill axis with a plurality of radial axes associated with the turbine rotor disk such that the single drill axis is prevented from departing one of the plurality of radial axes beyond design tolerances associated with a modification to be performed when drilling has been initiated.

2. The system of claim 1, wherein the drill has a self-feeding spindle and is configured to automatically drill a predetermined depth through the superalloy along the single drill axis upon initiation, and to automatically stop upon completion.

3. The system of claim 1, further comprising a compressed air subsystem including a compressed air receptacle, an air tank, and a drill interface, the compressed air subsystem configured to supply compressed air to the drill from both the compressed air receptacle and the air tank.

4. The system of claim 1, further comprising:
   an enclosure configured to enclose the system during transport and to permit operational access to the system upon deployment; and,
   a lubricant drip receptacle configured collect used lubricant.

5. The system of claim 1, further comprising: an integrated cutter lubricant system, and wherein the drill includes an internally cooled carbide drill bit that is lubricated and cooled internally by the integrated cutter lubricant subsystem.

6. The system of claim 1, wherein the drill mount is further configured to mechanically couple to at least one of the stand and the drill guide.

7. The system of claim 1, wherein the drill guide comprises a ring keyed to the turbine rotor disk.

8. The system of claim 1, wherein the turbine rotor disk includes a cooling arm; and,
   wherein the stand is further configured to position the cooling arm below the balance of the turbine rotor disk when drilling has been initiated.

9. The system of claim 1, wherein the system weighs less than 700 lbs.

10. The system of claim 1, wherein the stand includes an alignment ring to center the turbine rotor disk within the stand, posts to vertically position and support the turbine rotor disk within the stand, and clamps to secure the turbine rotor disk to the stand.

11. The system of claim 1, wherein the drill guide includes locking fasteners that are used in conjunction with the locking collar to lock the drill into place relative to the drill guide.

12. The system of claim 1, wherein each radial access hole of the plurality of radial access holes incorporates a bushing that is configured to interface with the bushing interface.

13. The system of claim 1, wherein the drill guide includes a hollow cylinder shape.

14. A system for modifying a turbine rotor disk, made of a superalloy, in the field, the system comprising:
   a stand configured to receive the turbine rotor disk, the stand including an alignment ring to center the turbine rotor disk within the stand and posts to vertically position and support the turbine rotor disk within the stand;
   a drill having a self-feeding spindle, a nose piece alignment bushing, and an integrated cutter lubricant subsystem, the drill configured to automatically drill a predetermined depth through the superalloy along a single drill axis upon initiation and to automatically stop upon completion;
   a drill guide having a plurality of radial access holes configured to receive the nose piece alignment bushing, each of the plurality of radial access holes associated with a radial axis associated with a cooling hole to be machined in the turbine rotor disk; and
   a drill mount configured to mechanically couple the drill to the drill guide when the nose piece alignment bushing is fully engaged with one of the plurality of radial access holes, the drill mount including
      a nose piece extension including a first end mechanically coupled to the drill and a second end distal to the first end, and
      a locking collar extending radially outward relative to the single axis from the nose piece extension proximal the second end.

15. The system of claim 14, further comprising a compressed air subsystem including a compressed air receptacle, an air tank, and a drill interface, the compressed air subsystem configured to supply compressed air to the drill from both the compressed air receptacle and the air tank.

16. The system of claim 14, further comprising:
   an enclosure configured to enclose the system during transport and to permit operational access to the system upon deployment; and,
   a lubricant drip receptacle configured collect used lubricant.

17. The system of claim 14, wherein the drill guide includes locking fasteners that are used in conjunction with the locking collar to lock the drill into place relative to the drill guide.

18. The system of claim 14, wherein the drill guide includes a hollow cylinder shape.

* * * * *